United States Patent Office 3,218,547
Patented Nov. 16, 1965

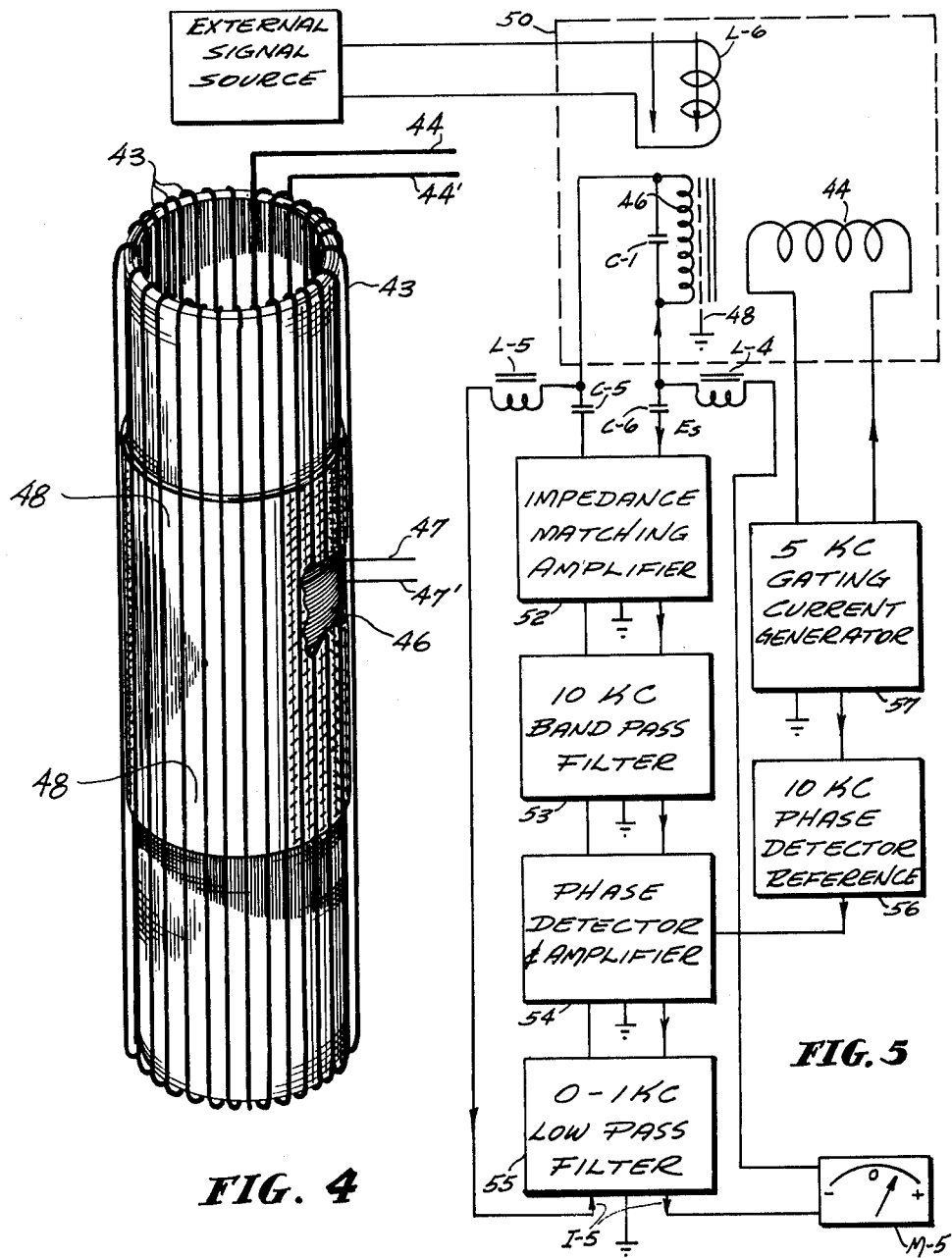

3,218,547
FLUX SENSING DEVICE USING A TUBULAR CORE WITH TOROIDAL GATING COIL AND SOLENOIDAL OUTPUT COIL WOUND THEREON
Sung Ching Ling, Ithaca, N.Y., assignor, by mesne assignments, to the United States of America as represented by the Administrator of the National Aeronautics and Space Administration
Filed Nov. 29, 1961, Ser. No. 155,584
10 Claims. (Cl. 324—43)

This invention relates to an improved magnetometer of the flux gate type, and more particularly, to an improved flux gate magnetometer in which gating flux leakage is minimized and substantially completely decoupled from the ambient flux intended to be measured by the magnetometer. In another sense the invention relates to an improved low-level modulator and amplifier of the magnetic amplifier type, having greatly improved sensitivity, and freedom from both contact noise and drift.

Flux gate magnetometers, which are widely used in various navigation devices as well as elsewhere, include means to gate or valve the ambient flux (usually the earth magnetic field) by saturating and desaturating a magnetic element to produce a fluctuating flux field, and a signal or pickup coil means situated in the fluctuation field to generate an output voltage proportional to the rate of change of the ambient flux. The magnetic element, constructed of high permeability magnetic material, concentrates the ambient earth magnetic field due to its higher permeability than that of the surrounding air. By applying a sufficiently strong magnetizing field to some or all of the magnetic material to saturate the material, the permeability of the material will be reduced to unity, which results in the collected or concentrated ambient flux being relegated to its normal condition, just as if the magnetic material were not present. A signal coil located so as to sense the change in collected ambient flux (ideally, while completely ignoring the gating or saturating flux), will provide an output signal. If the gating flux is not confined to a limited zone, but allowed to couple with the ambient field, it will be detected as noise or error by the pickup coil unless very careful filtering is provided. Also, if gating flux leaks from one magnetometer, the leakage flux will disturb the surrounding ambient field intended to be measured by any nearby second magnetometer, and thereby interfere with proper operation of the second magnetometer, and perhaps with various other electronic instruments, also.

In the present invention, because of a unique geometry of magnetic material and a unique flux gate design, the gating flux is substantially completely decoupled from the ambient flux being measured, and flux leakage from the flux gate is minimized. A principal embodiment of the invention includes a tubular high-permeability core of permalloy or ferrite, for example, having a gating flux winding wound on the core in toroid fashion, and a surrounding pick-up coil wound about the core in solenoidal fashion. The tubular magnetic core is uniformly saturated by a gating field provided by application of alternating current to the toroidal gating flux winding, so that residual flux in the core is reduced to a minimum. By arranging the gating field perpendicular to the solenoidal pickup or signal coil, Barkhausen noise generated by the gating field is also decoupled from the pickup coil, allowing detection of extremely weak ambient fields, of the order of 0.1 γ. (One γ equals 1×10⁻⁵ oersted, 1×10⁻⁵ gauss in air.) Filtering to separate the gating frequency from the output signal is unnecessary except for extremely weak fields.

The invention also is highly useful as a low-level signal modulator or modulating magnetic amplifier, as it provides extremely good low level sensitivity and freedom from the drift, contact potentials and noise which are characteristic of prior art signal modulators.

Thus it is a primary object of the present invention to provide an improved flux-gate type of magnetic measuring instrument.

It is a more specific object of the invention to provide an improved flux-gate magnetometer in which gating flux leakage is minimized and substantially completely decoupled from the ambient flux intended to be measured by the magnetometer.

It is another object of the invention to provide an improved low-level signal modulator and amplifier of the magnetic amplifier type having improved sensitivity and freedom from drift and contact noise.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 4 is a schematic diagram of a modified form of the invention wherein the signal coil is entirely surrounded by the signal pickup coil, and wherein electrostatic shielding is interposed between the gating winding and the signal pickup winding;

Figure 6:
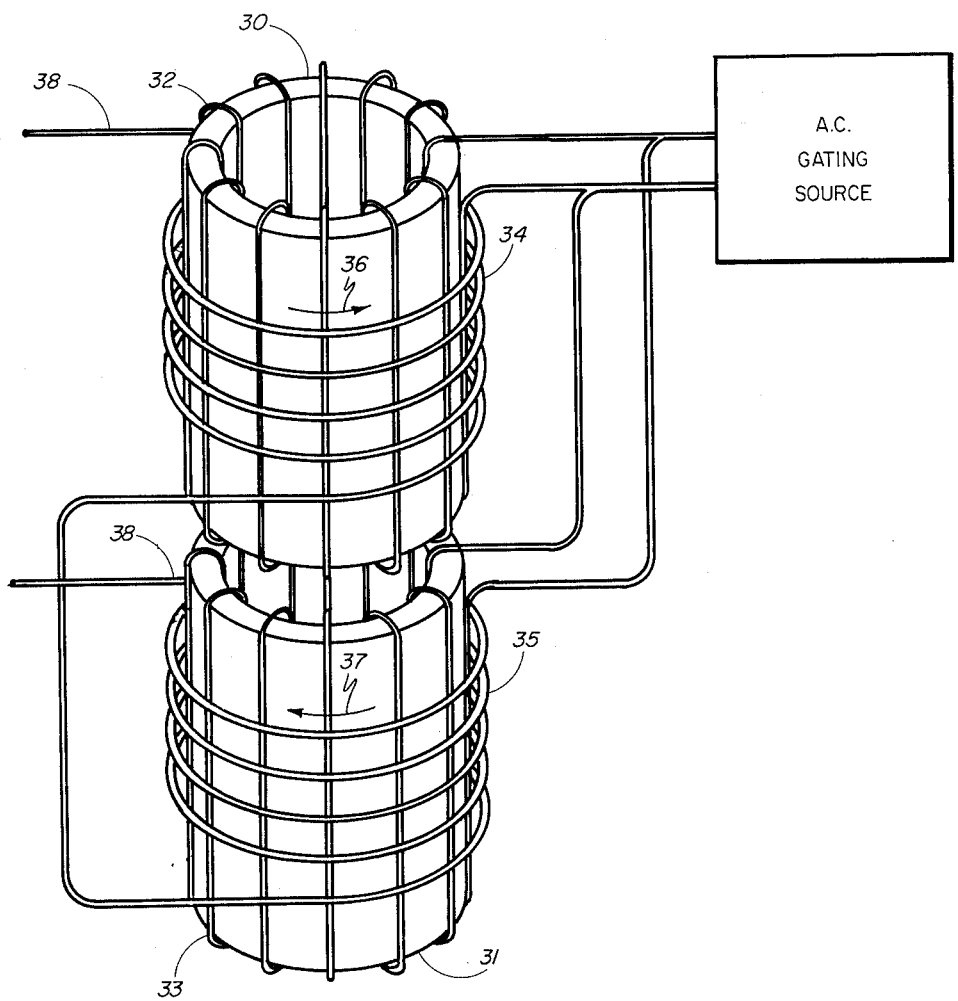

FIG. 5 is an electrical schematic diagram illustrating the use of the invention as an improved signal modulator or magentic amplifier element with which an extremely minute current may be detected. In FIG. 5 certain well-known circuit components are shown in block diagram form for the sake of clarity; and FIG. 6 is an electrical schematic diagram illustrating the use of two cores with circumferential gating fluxes in opposite directions whereby flux leaking from the two assemblies will tend to cancel each other.

The invention includes a high-permeability magnetic element in the form of a tube, for example, or an equivalent closed ring or loop of material, with its length $l$ (see FIG. 2a) generally made several times greater than its mean diameter, so as to improve the efficiency of ambient flux concentration. To reduce core loss, and thereby reduce the gating energy required, the wall thickness $t$ of the tubular core should be made thin compared to the other core dimensions. Core loss for a given core volume is minimized by keeping the core thickness to diameter ratio low and the length-to-diameter ratio high. Core loss in ferrite cores is principally due to hysteresis, eddy current loss being low due to the high bulk resistivity (for example, more than 200 ohm-cm.) of available ferrites. A ferrite core constructed for use with the invention will comprise a tubular (preferably cylindrical) hollow core of uniform diameter and wall thickness, such as core 15 in FIG. 1.

Figures 1, 2A, 2B:
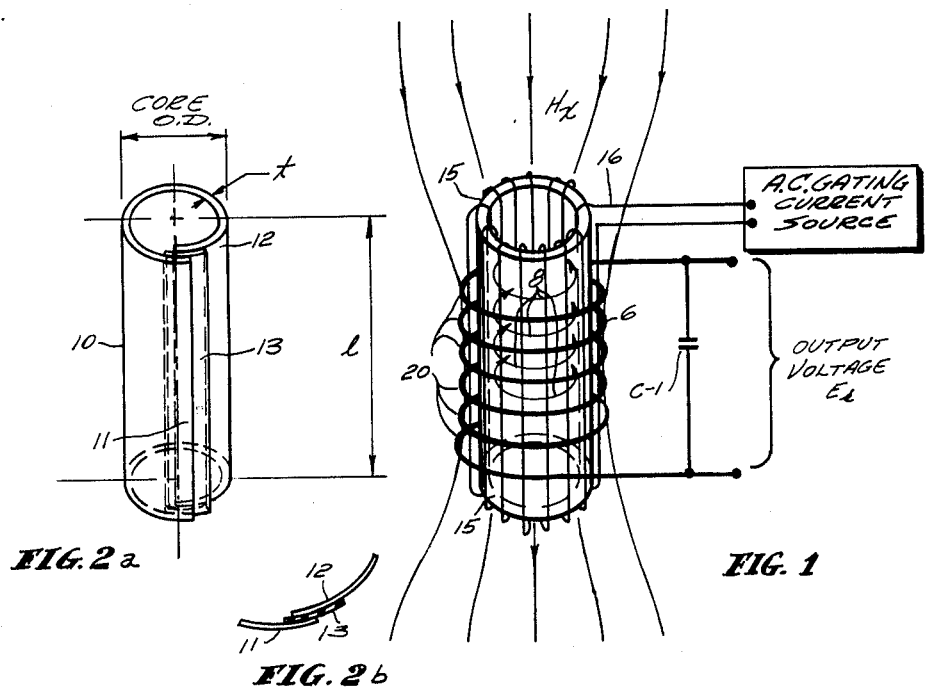
FIG. 1 is a schematic diagram illustrating the principles of operation of a complete embodiment of the invention.
FIGS. 2a and 2b illustrate the construction of one form of tubular core which may be used in the construction of the invention.

In those cores where supermalloy or permalloy is used in lieu of ferrite, a much larger percentage of core loss will be due to eddy currents. Therefore, the tubular core 10 may be split longitudinally as shown in FIGS. 2a and 2b to interrupt the circumferential electrical path around the core, and provided with a bridging member in the form of a ferrite-coated electrical insulation between the lapped joint, thereby providing an electrically "open" but magnetically continuous joint. In FIGS. 2a and 2b lapped ends 11 and 12 of the wall joint are provided with an electrically insulating spacer strip 13 formed of polystyrene or steatite, for example, strip 13 being coated with ferrite (not shown) so as to magnetically join ends 11 and 12 while keeping them electrically insulated from each other. A multi-turn lapped joint (not shown) in the form of the tape-wound core common in the transformer art also may be used instead without departing from the invention.

It should be noted that in any of the above described core forms the core geometry or cross-sectional area in the axial direction is made uniform, which operates to maintain minimum axial flux leakage. While it is not necessary in order to obtain most of the advantages of the invention, the tubular core is disclosed as being preferably cylindrical or circular in cross-section. It is possible instead to use cores of non-circular cross-section without departing from the invention, and to obtain very low amounts of axial and circumferential gating flux leakage by appropriately varying the winding density of the gating winding. Use of a non-circular tubular cross-section usually needlessly complicates the winding of the gating coil, however, and provides no special advantages.

The gating current winding 16 usually is wound in a modified toroidal-like manner as illustrated in FIG. 1, thereby generating a circular or circumferential magnetizing field $H_0$, acting in the direction shown by arrows 8, in FIG. 1. The coil should be wound with as little average pitch as possible, so that the long sides of each turn are as parallel as possible to the longitudinal axis of the core. In this manner the effective direction of the gating flux generated by the current in gating winding 16 will be, on the average, precisely perpendicular to the tube axis, thereby minimizing axial flux leakage. It is also important that toroidal winding 16 have uniform density along the circumference of the cylindrical tube, in order to provide minimum flux leakage. Since the toroidal winding completely surrounds the magnetic core, the gating flux is effectively confined to, or "bottled-up," inside the winding, where it cannot escape to induce noise into the pickup coil or any other nearby conductor.

Figure 3:
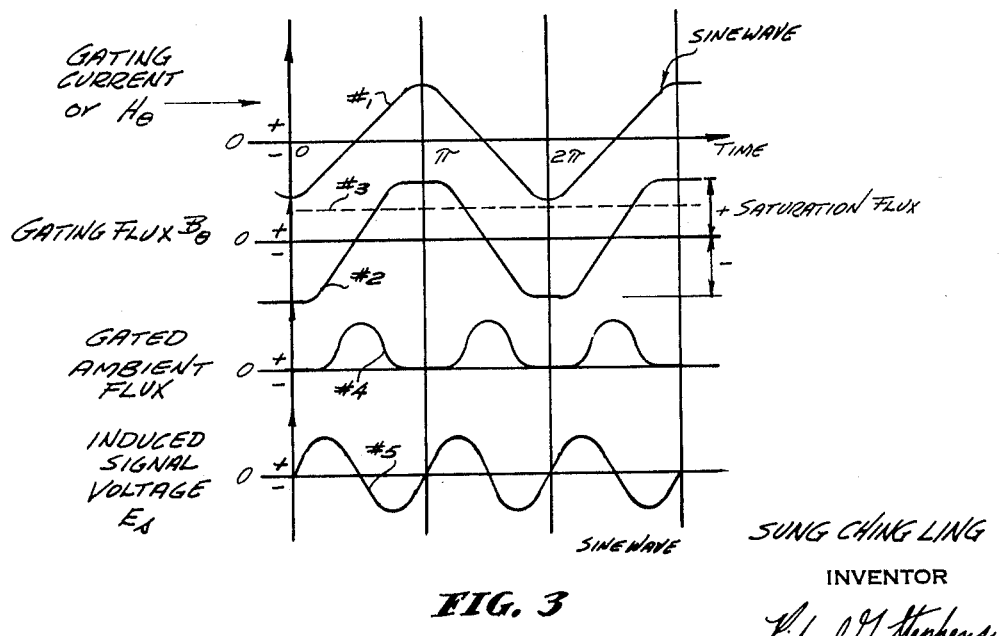
FIG. 3 is a plot of various voltages and magnetic fluxes, useful in understanding the operation of the invention.

In the absence of any gating flux, the high permeability of unsaturated magnetic core 15 collects or concentrates the ambient flux $H_x$ in the manner shown in FIG. 1, wherein equipotential magnetic forces lines of the ambient field are drawn in toward core 15. When the applied gating current and gating field $H_\theta$ become sufficiently high, the core becomes saturated in the circumferential direction, which reduces the permeability in the axial direction, thereby closing the flux gate to the ambient flux $H_x$ so that all the flux lines shown would become parallel. Then as gating current is alternated in the opposite direction, gating flux goes through a desaturation cycle, and then resaturation takes place in the opposite circular direction. Curve #1 in FIG. 3 is a plot of the alternating gating current applied to the gating winding, and the alternating magnetic field $H_\theta$ produced thereby. Curve #2 illustrates the resultant circular gating flux $B_\theta$ in the core. Dashed line #3 represents the constant value of the undisturbed ambient flux, to a much larger scale than that of the gating flux, and curve #4 illustrates the resultant gated ambient flux $B_x$. Because the ambient flux is gated each time the direction of the gating flux reverses, the gated ambient flux and the resulting output signal are principally the second harmonic, or double the frequency of the gating current and gating flux frequency. The signal voltage induced in pickup coil 20 is shown plotted as curve #5 in FIG. 3.

As shown in FIG. 1, the pickup coil or signal winding 20 is a solenoid-type of winding, coaxial to circular tube 15 and preferably provided with zero or extremely small average winding pitch, so that the average or effective coil field is precisely perpendicular to the effective direction of the gating coil field. Gating flux therefore is substantially completely decoupled from the signal winding, because of the relative perpendicularity of the two windings, and because the gating flux is effectively "bottled-up" inside the toroidal-type gating flux winding. Therefore, the voltage $E_s$ induced in signal coil 20 will be substantially free of noise or error due to gating flux interaction with the ambient flux, and also free of Barkhausen noise due to random turning of magnetic dipoles in the same plane of the circular gating flux. The signal induced in the signal coil thus will be a pure or "clean" signal proportional only to the rate of change of the gated ambient flux. While it usually is more convenient to wind the solenoidal signal coil *over* the toroidal gating flux coil, it is possible and within the scope of the invention to contain the solenoidal coil entirely *inside* the gating coil, with the toroidal winding completely surrounding both core and signal winding, in the manner shown in FIG. 4.

A further important advantage of the invention is that it is symmetrical with respect to both directions of gating magnetization, thereby enabling uniform or identical saturation in both gating flux directions. Various prior art devices which are unsymmetrical, cannot be uniformly saturated, and the resulting residual magnetism masks very low strength fields, making such prior devices generally unsuitable for measurements of the order of $50\gamma$ or less.

Various prior art devices employ the magnetic element of their magnetometers either as part of the electrical pickup signal circuit or as part of the gating circuit. Compared to the present invention these devices are undesirably susceptible to large leakage in either axial gating flux or circumferential gating flux. The magnetic material in the present invention, however, is electrically insulated from both the gating winding and the pickup winding. In addition, through use of a cylindrical magnetic core perfectly symmetrical about its longitudinal axis, not only are the axial and circumfrential gating flux leakages considerably diminished, but the entire magnetic material goes through substantially identical opposite half-cycles of magnetization, thereby obviating error due to residual static magnetism.

An early working model of the invention embodied a tubular core of type A–3 ferrite commercially available from Ferrocube Corp., with a core length of 2.3 inches, 4 millimeters outside diameter and 2 millimeters inside diameter. The permeability $\mu$ of the ferrite was approximately 1000. The gating coil, which was wound in the toroidal fashion shown above contained 18 turns of #30 wire. The signal coil comprised 1200 turns of #36 wire wound in usual solenoid form over the toroid winding and concentric with the axis of the ferrite core. A 5 kilocycle per second gating current with a peak current of 300 milliamperes was sufficient to drive the core beyond saturation. A capacitor shown at C–1 in FIG. 1 was connected across the signal coil, with its value selected to make the signal coil-capacitor circuit parallel-resonant at ten kilocycles per second, or double the frequency of the gating current. The peak signal voltage obtained for the earth magnetic field (approximately ½ gauss at the test location) was about 50 volts, indicating a sensitivity of 100 volts per gauss. This sensitivity clearly surpasses that of typical prior art flux gate magnetometers, which typically have a sensitivity of 1.0 volt per gauss when provided with a comparable physical size. The signal has sufficient strength to be applied directly, without further amplification to operate servomechanisms and similar devices. While nuclear resonance magnetometers may have a comparable sensitivity, they are relatively expensive, elaborate and complex and relatively unsuitable for missile and spacecraft applications where size and weight are crucial limitations.

In the invention, leakage of gating flux has been diminished to where the measure leakage flux to gating flux ratio was of the order of $10^{-8}$, which is significantly smaller than any other known types of flux gate magnetometers. The signal provided from the pickup coil of the test device was so remarkably free from noise that no filtering was deemed necessary for ambient fields above $5\gamma$.

In order to cancel out even the extremely minute amount of gate flux leakage present due to inhomogeneities and winding irregularities, two substantially identical magnetometer coils constructed in accordance with the invention may be located mutually coaxially in line, or axially parallel to one another, with the gating coils connected electrically 180 degrees out-of-phase, and hence with the circumferential gating fluxes in the two cores turning in opposite directions, whereby fluxes leaking from the tow assemblies wil ltend to cancel each other. The signal coils of the two magnetometers may be connected in series and additively, or electrically in phase. In this manner, the very small remaining induced voltage due to gating flux leakage may be balanced out to provide an absolute zero output signal when the ambient field is zero.

Turning now to FIG. 6, wherein is shown the foregoing two core method of cancelling leakage flux resulting in an improved measuring apparatus. Two cores 30 and 31 are located axially parallel to one another, the first core 30 is surrounded by a first toroidal winding 32, while the second core 31 is surrounded by a second toroidal winding 33. The first core 30 is also surrounded by a first solenoidal winding 34 and the second core 31 is surrounded by a second solenoidal winding 35. An A.C. gating source is connected to the toroidal windings 32 and 33 in such a manner that the circumferential gating flux generated in the cores are in opposite directions as illustrated by the arrows 36 and 37. The first and second solenoidal windings 34 and 35 are connected in a series additive relation so that the output 38 will be a summation of the signals generated in each of the solenoidal windings. It is apparent that by having opposing circumferential gating fluxes, the leakage fluxes will tend to cancel each other thereby providing a more accurate output indication of the ambient flux passing longitudinally through the cores.

A further technique useful in further decoupling the gating signal from the induced output signal is to electrostatically shield the signal pickup coil from the gating flux winding, thereby to reduce the gating signal component conducted through distributed capacity between the gating current winding and the signal coil. In the embodiment of the invention shown in FIG. 4, the cylindrical ferrite core is first wound with a solenoidal pick-up signal coil 46 (having leads 47, 47'). Over winding 46 is wound a conductive non-magnetic member, such as a soft copper foil 48, which extends axially sufficiently to cover signal winding 46. The overlapping ends of the foil must be electrically insulated from one another to avoid being a shorted turn. A gating or magnetizing winding 43 (having leads 44, 44') is wound in toroidal fashion in the manner of gating winding 16 of FIG. 1, but *over* rather than *under* the signal pickup coil.

Any conductive non-magnetic sheet wrapped between the toroidal gating coil and the solenoidal signal coil will serve to decrease the capacity between the two, and thereby further decrease the presence of gating signal in the signal coil output voltage. Various forms of electrostatic shielding between pairs of magnetically coupled coupled transformer coils are well-known in the art, and similar techniques may be used to isolate the two magnetically de-coupled coils of the magnetometer of the present invention.

While FIG. 4 illustrates an embodiment of the invention wherein an electrostatic shield is used with a magnetometer having the gating coil *outside* the signal winding, it should be recognized that such a shield may as well be used with a converse arrangements disclosed in FIGS. 1 and 2. As will be further explained below it sometimes will be found useful to include additional windings, such as a second solenoidal winding coaxial with signal coil 46. For example, in some applications of the invention the winding shown at 46 in FIG. 4 actually could constitute two bi-filar windings. Alternatively, the additional winding (not shown in FIG. 4) may be wound either inside or outside of signal coil 46, but coaxial with coil 46. Any additional winding provided in the same form as coil 46 will be equally decoupled from the gating flux, of course. A typical use for such an additional winding is exemplified below in connection with FIG. 5.

Other combination of magnetometers are possible. For example, four magnetometers may be connected as a four-arm bridge, and physically arranged in the form of a square frame, with adjacently-disposed arms connected with their gating fluxes arranged substractively and their signal coils connected in series and subtractively.

FIG. 5 illustrates how the invention may be utilized as an improved signal modulator capable of detecting extremely low-level signals by converting them to minute flux fields and measuring them. The magnetometer of FIG. 4 is shown encased within a magnetic shield, such as a can of multi-layer Mumetal, represented simply by dashed line 50 in FIG. 5. The electrical signal to be detected, which might be an extremely minute current from a thermocouple or an ionization chamber, for example, is applied to an additional coil L-6 wound coaxially with signal coil 46 of the magnetometer. Thus the magnetometer is arranged to sense a magnetic field proportional to the minute signal current, and the earth ambient field is excluded by shield 50. The device does not suffer from the contact noise of electromechanical choppers nor from the drift limitations of semiconductor choppers. Signals of the order of $1 \times 10^{-18}$ watt have been measured with quite satisfactory stability (freedom from drift).

In FIG. 5 the signal coil output is shown being applied through blocking capacitors C-5 and C-6 to an impedance matching amplifier shown in block form. Being parallel-tuned the magnetometer output signal coil constitutes a high impedance signal source, and matching amplifier 52 is provided with a low-output impedance. Impedance-matching amplifier 52 applied its output signal to a conventional band-pass filter 53 which rejects the small amount (if any) of gating frequency fundamental and third harmonic, and passes the second harmonic signal frequency. Conventional amplifying and pahase-detecting circuits shown simply as block 54 provide a direct current output signal commensurate in magnitude and polarity with the applied signal current connected to coil L-6, and low-pass filter 55 removes the gating frequency second harmonic carrier signal (10 Kc. in the circuit shown). The direct voltage output signal is shown connected to operate an ordinary d'Arsonval meter M-5, and it should be apparent that it is also may be applied to a variety of other utilization devices. The gating current source 57 is shown connected to a frequency doubler source 56 to supply the phase detector reference signal.

The system of FIG. 5 may be linearized in accordance with known feedback amplifier techniques. By connection of the D.C. output signal (via chokes L-5 and L-4) to the magnetometer output coil 46, the output signal coil will provide a degenerative or bucking field to balance out the "ambient" field produced inside the Mumetal can by the feeble signal current being measured. Sufficient loop gain may be provided in the loop circuit shown to render the relationship between magnetometer output and D.C. voltage output as linear as desired. The ambient field is hardly disturbed, and the entire system is very stable.

It will be apparent that a variety of other uses may be made of the invention. For example, rather than applying the system output signal back to coil 46, as done in FIG. 5, that direction-sensitive voltage may be used to control a conventional servomotor (not shown) mechanically connected to rotate the entire magnetometer (without coil L–6 or shielding 50) to orient the magnetometer in the manner of a flux-gate compass.

It also should be apparent that in applications of the magnetic amplifier form of the invention, the assembly need not be encased in a magnetic housing if the earth's ambient field is an insignificant fraction of the field produced by the input signal.

The word "toroidal" is used herein in a broad sense to embrace any winding which progresses around the walls of any hollow or tubular member, such as a hollow cylinder, for example, and not merely in the strict classical geometry sense, of course. Similarly, the word "solenoidal" is intended to embrace those signal pickup coils wrapped around non-circular cross-section cores as well as simple cylindrical tubular cores.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A flux sensing device comprising: a tubular core of high permeability conductive metal alloy having a longitudinal axis and uniform dimensions in the axial direction, said tubular core having a longitudinal gap in the wall thereof; an insulating spacer closing such gap and having a ferrite material coated thereon for contacting the edges of said gap; a toroidal gating coil surrounding said core and responsive to an alternating current signal for gating said tubular core; and a solenoidal signal output coil wound coaxially about said longitudinal axis for detecting any change in magnetic flux passing through said tubular core.

2. The flux sensing device of claim 1 further including indicating means connected to said solenoidal signal output coil for indicating the intensity of said magnetc flux.

3. The flux sensing device of claim 1 further including an electrostatic shielding means interposed between said gating coil and said signal pick-up coil to reduce the distributed capacity therebetween.

4. The flux sensing device of claim 1 further including a magnetic housing for shielding said flux sensing device from external magnetic fields; and an input coil means of solenoidal form wound coaxial with said core and responsive to an applied input signal for applying a longitudinal magnetic field to said core.

5. The flux sensing device of claim 4 including reference means for providing a reference signal, the frequency of which is twice that of the frequency of the alternating current gating signal; and a phase-detector connected to said output coil and said reference means to provide a direct current output voltage.

6. Apparatus according to claim 5 in which feedback means is provided to couple a portion of said direct current output voltage to said output coil to provide a degenerative action and thereby act to balance out the ambient field produced within said magnetic housing by said input coil means.

7. The flux sensing device of claim 6 further including a voltage indicating means connected to said phase-detector for measuring the direct current voltage therefrom.

8. A flux sensing device having low gating flux leakage comprising: a first cylindrical tubular core of high permeability saturable magnetic material having a longitudinal axis and uniform dimensions in the axial direction; a first toroidal gating coil wound on said first core with substantially zero average pitch and uniform winding density around the circumference of said core and operative upon excitation by an alternating gating current to provide an alternating circumferential gating field; a first signal pick-up coil of solenoidal form having substantially zero average winding pitch wound coaxially with said first cylindrical core to provide an output voltage commensurate with the magnetic flux gated by said first core; a second cylindrical tubular core of high permeability saturable magnetic material having a longitudinal axis and uniform dimensions in the axial direction; a second toroidal gating coil wound on said second core with substantially zero average pitch and uniform winding density around the circumference of said core and operative upon excitation by said alternating gating current to provide an alternating circumferential gating field; a second signal pick-up coil of solenoidal form having substantially zero average winding pitch wound coaxially with said second cylindrical core to provide an output voltage commensurate with the magnetic flux gated by said second core; said first and second cylindrical tubular cores being axially parallel to one another so that the magnetic flux passing longitudinally through the cores is the same; said gating coils connected electrically one hundred and eighty degrees out of phase, thereby creating opposing circumferential gating fluxes in the two cores whereby flux leaking from the two gate windings will tend to cancel each other; and said first and second signal pick-up coils connected in series additive for providing an output which is the summation of the signal detected by the two signal coils.

9. The flux sensing device of claim 8 further including a magnetic housing for shielding said flux sensing device from external magnetic fields; and first and second solenoidal input coils wound coaxial with said first and second cores, respectively, and responsive to an applied input signal, said first and second input coils connected together to apply a longitudinal magnetic field in the same orientation to said first and second cores.

10. The flux sensing device of claim 9 further including an indicating means connected to said first and second signal pick-up coils for measuring the output therefrom.

References Cited by the Examiner

UNITED STATES PATENTS

| | | | |
|---|---|---|---|
| 2,876,419 | 3/1959 | Gianola | 332—51 |
| 2,916,696 | 12/1959 | Schonstedt | 324—43 |
| 2,949,591 | 8/1960 | Craige | 336—178 |
| 3,049,662 | 8/1962 | Abragham et al. | 324—43 |
| 3,064,185 | 11/1962 | Ferguson | 324—43 |

FREDERICK M. STRADER, *Primary Examiner.*

WALTER C. CARLSON, *Examiner.*